(12) United States Patent
Barone et al.

(10) Patent No.: US 9,256,000 B2
(45) Date of Patent: Feb. 9, 2016

(54) LOW FREQUENCY FOLDED PENDULUM AND VERTICAL SEISMIC SENSOR UTILIZING SUCH A FOLDED PENDULUM

(75) Inventors: Fabrizio Barone, Naples (IT); Gerardo Giordano, Salerno (IT); Fausto Acernese, Fisciano (IT)

(73) Assignee: UNIVERSITA DEGLI STUDI DI SALERNO, Fisciano (IT)

( * ) Notice: Subject to any disclaimer, the term of this patent is extended or adjusted under 35 U.S.C. 154(b) by 236 days.

(21) Appl. No.: 13/982,881

(22) PCT Filed: Apr. 20, 2012

(86) PCT No.: PCT/IT2012/000115
§ 371 (c)(1),
(2), (4) Date: Oct. 10, 2013

(87) PCT Pub. No.: WO2012/147112
PCT Pub. Date: Nov. 1, 2012

(65) Prior Publication Data
US 2014/0036637 A1    Feb. 6, 2014

(30) Foreign Application Priority Data
Apr. 28, 2011 (IT) .............................. RM2011A2220

(51) Int. Cl.
*G01V 1/18* (2006.01)
*G01H 1/00* (2006.01)
*G01V 1/16* (2006.01)
*G01P 15/08* (2006.01)

(52) U.S. Cl.
CPC .. *G01V 1/18* (2013.01); *G01H 1/00* (2013.01); *G01P 2015/0805* (2013.01); *G01V 1/162* (2013.01)

(58) Field of Classification Search
CPC ..... G01P 2015/0805; G01H 1/00; G01V 1/162
USPC ........................................................... 367/179
See application file for complete search history.

(56) References Cited

U.S. PATENT DOCUMENTS

| 2,742,779 | A | * | 4/1956 | Stein ............................... 73/652 |
| 5,095,749 | A | * | 3/1992 | Hanson ........................... 73/497 |
| 5,528,936 | A | * | 6/1996 | Falk .......................... 73/514.26 |
| 2012/0167686 | A1 | * | 7/2012 | Giordano et al. .......... 73/514.36 |

FOREIGN PATENT DOCUMENTS

WO     2011/004413     1/2011

OTHER PUBLICATIONS

Acernese, F., et al., Tunable mechanical monolithic horizontal accelerometer for low frequency seismic noise measurement, Remote Sensing for Environmental Monitoring, GIS Applications, and Geology IX, Proc. of SPIE 2009, 7478: 72782R-1-72782R-12.

(Continued)

*Primary Examiner* — Mark Hellner
(74) *Attorney, Agent, or Firm* — Steinfl & Bruno LLP

(57) ABSTRACT

A folded pendulum is described. The folded pendulum can be a monolithic pendulum and is positioned in the vertical configuration. The folded pendulum allows for more compact realizations through high decouplings of a vertical degree of freedom from other degrees of freedom as well as optimal mechanical quality factors.

17 Claims, 7 Drawing Sheets

(56) References Cited

OTHER PUBLICATIONS

Acernese, F., et al., Tunable mechanical monolithic sensor with interferometric readout for low frequency seismic noise measurement, Remote Sensing for Environmental Monitoring, GIS Applications, and Geology VIII, Proc. of SPIE 2008, 7110: 711011-1-711011-12.

Acernese, F., et al., Tunable mechanical monolithic horizontal accelerometer for low frequency seismic noise measurement, Sensors and Smart Structures Technologies for Civil, Mechanical, and Aerospace Systems, Proc. of SPIE 2009, 7292: 72922J-1-72922J-12.

Acernese, F., et al., New tunable mechanical monolithic horizontal seismometer for frequency seismic noise measurement, Sensors and Smart Structures Technologies for Civil, Mechanical, and Aerospace System, Proc. of SPIE 2010, 7647: 76472X-1-76742-10.

Bertolini, A., et al., Geometric anti-spring vertical accelerometers for seismic monitoring, Nuc. Instr. & Methods in Phys. Res. A 2004, 518: 233-235.

Bertolini, A., et al., Mechanical design of a single-axis monolithic accelerometer for advanced seismic attenuation systems, Nuc. Instr. & Methods in Phys. Res. A 2006, 556: 616-623.

Hayskov, J., Instrumentation in earthquake seismology, preliminary version, Jun. 2002, pp. 1-313.

Ingate, S., et al., Prospects for Low-frequency Seismometry, Mar. 24-26, 2004, Berkeley, CA, pp. 1-30.

Acernese, F., et al., "Tunable mechanical monolithic horizontal sensor with high Q for low frequency seismic noise measurement," 8$^{th}$ Edoardo Amaldi Conference on Gravitational Waves, Journal of Physics: Conference Series 228, pp. 1-6, 2010.

Acernese, F., et al., "Mechanical monolithic accelerometer for suspension inertial damping and low frequency seismic noise measurement," 7$^{th}$ Edoardo Amaldi Conference on Gravitational Waves, Journal of Physics: Conference Series 122, pp. 1-6, 2008.

Acernese, F., et al., "Mechanical monolithic horizontal sensor for low frequency seismic noise measurement," Review of Scientific Instruments, No. 79, 074501, pp. 1-8, 2008.

Barone, F., "Low-noise, mechanical, monolithic seismic sensors," SPIE Newsroom, p. 1-2, doi: 10/1117/2.1200907.1742, 2009.

Giordano, G., "Development and test of tunable mechanical monolithic horizontal accelerometer for low frequency seismic noise measurement," Tesi di Dottorato in "Rischio Sismico", Universita' degli Studi di Napoli "Federico II", 162 pp., 2008.

Saulson, P., "Thermal noise in mechanical experiments," Physical Review D, Particles and Fields, 3$^{rd}$ series, vol. 42, No. 8, pp. 2437-2445, The American Physical Society, 1990.

Smith, S., et al., "Elliptical flexure hinges," Review of Scientific Instruments, vol. 68. No. 3, pp. 1474-1483, 1997.

Tseytlin, Y., "Notch flexure hinges: An effective theory," Review of Scientific Instruments, vol. 73, No. 9, pp. 3363-3368, 2002.

Liu, J., et al., "Near-shore ocean wave measurement using a very low frequency folded pendulum," Measurement, Science and Technology, No. 9, pp. 1772-1776, 1998.

PCT International Search Report mailed on Nov. 15, 2012 for PCT Application PCT/IT2012/000115 filed on Apr. 20, 2012 in the name of Universita Degli Studi Salerno.

PCT Written Opinion mailed on Nov. 15, 2012 for PCT Application PCT/IT2012/000115 filed on Apr. 20, 2012 in the name of Universita Degli Studi Salerno.

* cited by examiner

LOW FREQUENCY FOLDED PENDULUM AND VERTICAL SEISMIC SENSOR UTILIZING SUCH A FOLDED PENDULUM

CROSS REFERENCE TO RELATED APPLICATIONS

The present application is the US national stage of International Patent Application PCT/IT2012/000115 filed on Apr. 20, 2012 which, in turn, claims priority to Italian Patent Application RM2011A000220 filed on Apr. 28, 2011.

The present invention concerns a low frequency folded pendulum with high mechanical quality factor in vertical configuration, and vertical seismic sensor utilizing such a folded pendulum.

More in detail, the present invention concerns a folded pendulum, which can be realized also as a monolithic pendulum, not positioned in its classical horizontal configuration, and as such developed and known in literature, but in the "vertical" configuration, i.e. rotated up to 90°, either clockwise or anticlockwise. In particular, the mono-block version of such a vertical folded pendulum allows very compact realizations, characterised by high decoupling of the vertical degree of freedom from the other degrees of freedom and optimal mechanical quality factors.

Furthermore, the invention concerns a seismic sensor utilizing such folded pendulum in the vertical configuration, by measuring the mutual displacement of the test mass of the pendulum and the support of the same, thus resulting in a vertical seismic sensor.

Moreover; considering the direct applicability of a part of the intermediate results to the folded pendulum in horizontal configuration, it is object of the present invention is to provide a new technique for the calibration of resonance frequency of a horizontal pendulum as well.

Finally, in view of the direct applicability of the methodologies and techniques of the present invention to all the configurations of the folded pendulum that are obtained by rotating it, either clockwise or anticlockwise, starting from the horizontal configuration up to the vertical configuration (90° rotation), it is object of the present invention to provide a technique that allows to utilize and calibrate the frequency of a rotated folded pendulum, and to realize a seismic sensor.

BACKGROUND ART

The principle whereon the majority of the mechanical systems are based, which are nowadays in use for the measurement of the absolute verical displacement is that of the measurement of the relative displacement with respect to an ideally inertial mass. The existing realizations integrate mechanical principles and techniques of various nature and accuracy [1] [2] [3].

The quality of the realization of the reference inertial mass limits the sensitivity of the system in general, and most of all the frequency band of the system, in a particular way in the region of low frequencies. This notwithstanding, even in the hypothesis one had at disposal a really inertial mass, the measurements would be in any case limited by the thermal noise of the same mass, the noise of the reading system and the interaction of the sensor with the ambient noises [1] [2] [3].

In the case of vertical displacement measurements, such systems in general make use of or can be related to an oscillating system, e.g. a strap of suitable length locked at one of its ends. On the other end of such a tape a suitable mass is positioned, which constitutes as a matter of fact he inertial mass. The realization of a measurement with good sensitivity at low frequencies implies, therefore, that the mechanical oscillating system has very low resonance frequency together with a good mechanical quality factor. Generally this system is realized by means of a feed-back system, so that the inertial mass is maintained fixed in the position chosen as reference by means of a feedback control system. The error signal of the control system, as obtained by suitable measurement sensors, provides the vertical acceleration signal, wherefrom it is possible to extract the absolute vertical displacement signal, obviously limited by the sensitivity and the measurement band of the system.

The following are of utmost importance in the realization of a mechanical system for the measurement of the absolute as well: an effective decoupling of the vertical degree of freedom from the other degrees of freedom (horizontal movements, rotations, etc.) and a high mechanical quality factor, which is an index of reduced energetic leakages of the oscillating system (thermal noise of the joints, viscous effect of the air, etc.), necessary for the apparent movement of the inertial mass not to be influenced by the movement of the fixed part of the mechanical system supporting such a mass.

Mechanical systems a with very low resonance frequency generally have, however, very large dimensions, are complex to be realized and calibrated, and most of all they are not dimensionally scalable. Indeed, such systems require firstly the balancing of the gravity force acting on the inertial mass, which, especially at low frequencies, becomes a problem owing to the weight of the same mass, and, therefore, the necessity of large forces to be applied for its positioning. Moreover, as one widen the measurement band of these low-frequency sensors the system sensitivity to the ambient noises widely increases (variations of temperature, pressure, humidity, etc.) as well as the problems of decoupling between the vertical degree of freedom and the other degrees of freedoms [1] [2][3].

Only the low-frequency system constituted by a Watts pendulum [4] differs from all the existing mechanical systems, which is realized also in the monolithic form (with joints worked by electro-erosion), both in the classically known experimental embodiment with joints in traction [5] [6], and in a new embodiment with some joints in compression (Italian patent application [7], here integrally included by reference), which unites, to a full dimensional scalability of the sensor, a full tunability of the resonance frequency, high quality factors, large measurement frequency band, reduced problems of coupling between the various degrees of freedom and wide insensitivity to the ambient noises, as a consequence of an efficient signal readout system based on optoelectronic methods, for example optical levers and laser interferometers [8]. The progresses in the technological development of such a folded pendulum, which however owing to its structure can be used only for horizontal applications, are described by a wide literature [9-17].

OBJECT AND SUBJECT-MATTER OF THE INVENTION

It is object of the present invention to provide a vertical folded pendulum, never realized nor suggested in literature, whose resonance frequency can be calibrated both by means of a calibration mass, with procedures analogous to those known and applied in literature [5-8], and by means of the application of external forces, suitably quantified and directed.

It is intermediate object of the invention, needed to realize a vertical folded pendulum, and, therefore, to provide a horizontal folded pendulum whose resonance frequency can be calibrated, besides applying the classical way as described in literature [5-8], also by application of an external constant force and parallel to (additive or subtractive) the gravity force, whose direction is defined by the normal to the tangent to the motion of the central mass in the point of minimum potential, as will be illustrated in detail in the following.

It is further specific subject-matter of the present invention to provide a vertical oscillations (e.g. seismic) sensor based on the folded pendulum object of the invention, as well as a technique allowing the calibration of the existing horizontal seismic sensors, based on the folded pendulum, which solves the problems and overcomes the drawbacks of the prior art.

It is subject-matter of the present invention a folded pendulum with tunable oscillation frequency, comprising:
  a support;
  a test mass;
  a simple pendulum;
  an inverted pendulum;
the simple pendulum and the inverted pendulum being connected at one of their ends to the test mass and at the other end to the support by means of 4 corresponding joint systems, the test mass being not connected to the support and being therefore free to oscillate,
the folded pendulum being characterised in that:
  with reference to the equilibrium static position, the simple pendulum and the inverted pendulum are positioned substantially along a disposition direction perpendicular to the tangent to motion of the test mass in the point of geometrical centering with respect to the support;
  a first means configured to or suitable for applying a first constant external force in one or more points of the simple pendulum, and/or the inverted pendulum and/or the test mass, in the direction of the tangent to motion of the test mass in the point of geometrical centering with respect to the support;
  a second means configured to or suitable for applying a second constant external force along said disposition direction in one or more points of the simple pendulum, and/or the inverted pendulum and/or the test mass, to generate a local conservative field of pre-defined value;
the oscillation frequency of the folded pendulum being a function of said second external force.

Preferably according to the invention, under gravity conditions, and with the folded pendulum rotated o fan angle α0 with respect to the gravity force g, said first constant external force is parallel to the component $g_\beta$ of the gravity force along a direction that is rotated by the same angle α with respect to the gravity force, and is such to compensate at least partially said component $g_\beta$, whilst said second constant external force is parallel to the component $g_\alpha$ of the gravity force that is perpendicular to the component $g_\beta$.

Preferably according to the invention, the junction systems relevant to the simple pendulum comprise each one or more joints in tension with respect to said second constant external force, and the joint systems relevant to the inverted pendulum comprise each one or more joints in compression with respect to said second constant external force.

Preferably according to the invention, said first constant external force is obtained mechanically by pre-bending the joints, by rotation of the same, during the production phase.

Preferably according to the invention, said first constant external force is a magnetic force that acts on the test mass.

Preferably according to the invention, said second constant external force is a magnetic force acting on the test mass.

It is further specific subject-matter of the present invention a folded pendulum with tunable oscillation frequency, comprising:
  a support;
  a test mass;
  a simple pendulum;
  an inverted pendulum;
  the simple pendulum and the inverted pendulum being connected at one of their ends to the test mass and at the other end to the support by means of four corresponding joint systems, the test mass being not connected to the support and being therefore free to oscillate, the joint systems relevant to the simple pendulum comprising one or more joints in tension, the joint systems relevant, to the inverted pendulum comprising one or more joints in compression,
the folded pendulum being characterised in that:
  it comprises means configured to or suitable for applying a constant external force in one or more points of the simple pendulum, and/or the inverted pendulum and/or the test mass, in the direction of the tangent to motion of the test mass in the point of geometrical centering with respect to the support;
the oscillation frequency of the folded pendulum being a function of said external force.

Preferably according to the invention, said constant external force is a magnetic force acting on the test mass.

Preferably according to the invention, it is formed from a monolithic block of material, suitably machined.

Preferably according to the invention, the monolithic block is cut-machined by electro-erosion.

Preferably according to the invention, each of said joint systems comprises two joints.

Preferably according to the invention, said one or more joints are elliptic joints.

Preferably according to the invention, said joint systems comprise two joints traced by removal of two ellipses with eccentricity $\epsilon > 3.2$ and having mutual distance $d > 10$ micron.

Preferably according to the invention, the test mass has a form that is substantially parallelepipedic with a central opening, realized in order to reduce its mass.

Preferably according to the invention, the distance between the facing sides of the test mass or the support and in each case of the simple pendulum or inverted pendulum is of at least of 250 μm.

It is further specific subject-matter of the present invention an oscillations sensor, in particular seismic sensor, comprising:
  a folded pendulum comprising a test mass and a support, a simple pendulum and an inverted pendulum;
  a system for detection of the apparent displacement of the test mass with respect to the support,
  and characterised in that the folded pendulum is the folded pendulum subject-matter of the invention.

Preferably according to the invention, said system for detection of the apparent displacement of the test mass is an optical system and comprises:
  a light source that sends a light beam on to said test mass, and precisely on to
  a mirror that is integral to said test mass,
  a device for detection of the light reflected by said mirror;
  an electronic elaboration device for the calculation of said apparent displacement.

The invention will be now described by way of illustration but not by way of limitation, making reference to the figures of the annexed drawings, wherein.

Figure 1:
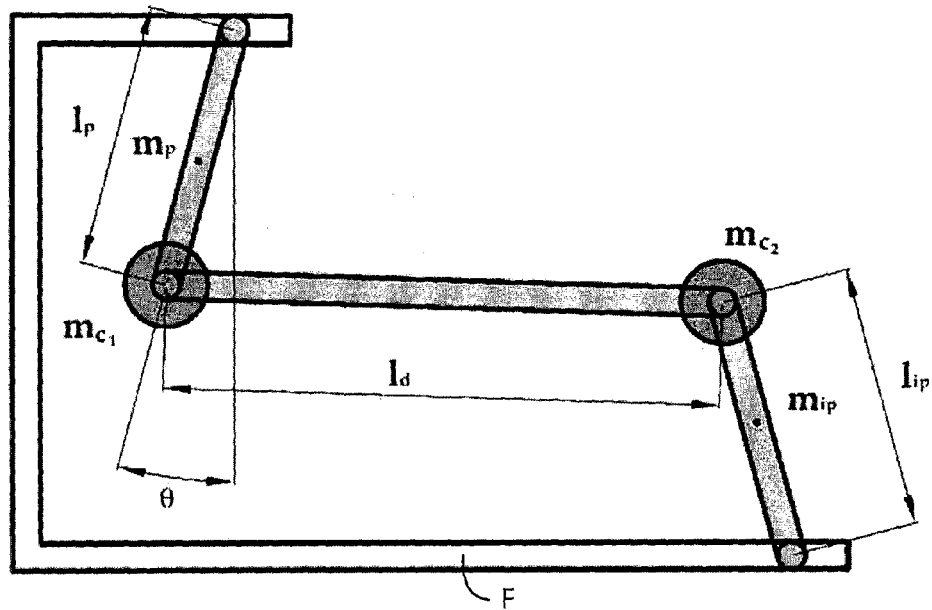
FIG. 1 shows a principle scheme of a folded pendulum according to the known teachings.
Figure 3:
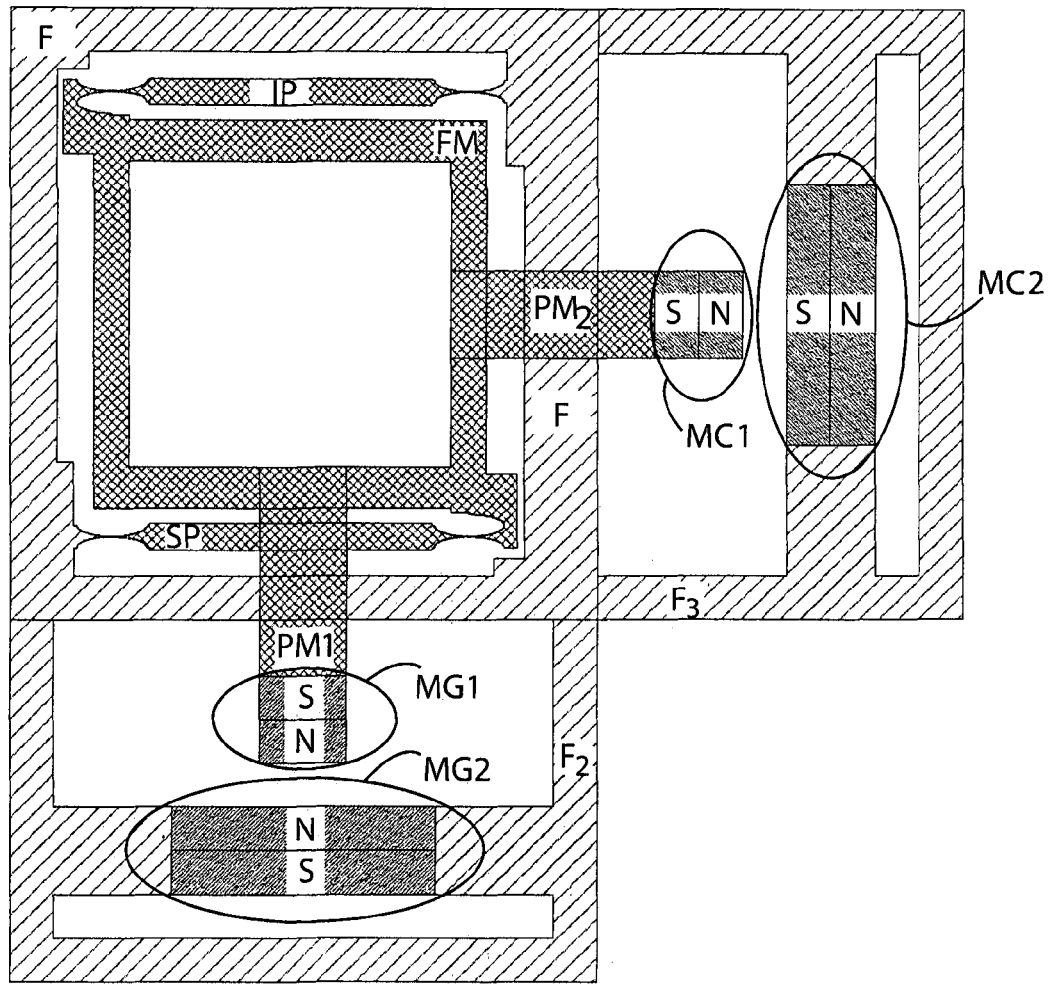
Figure 4:
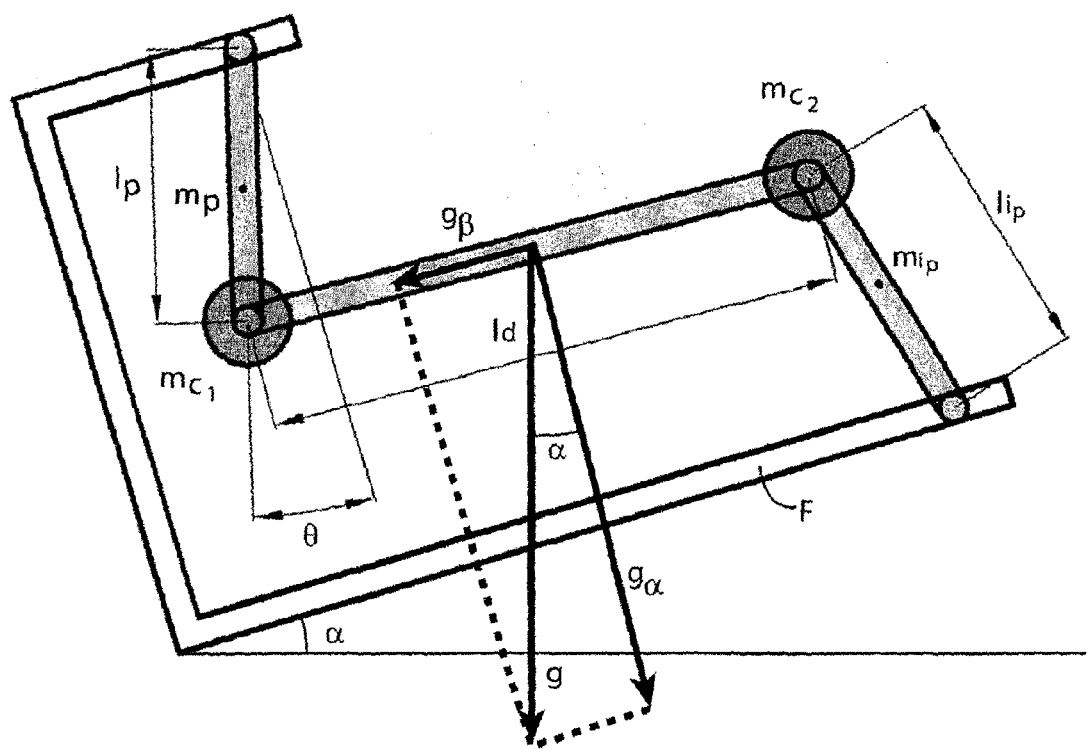
Figure 5:
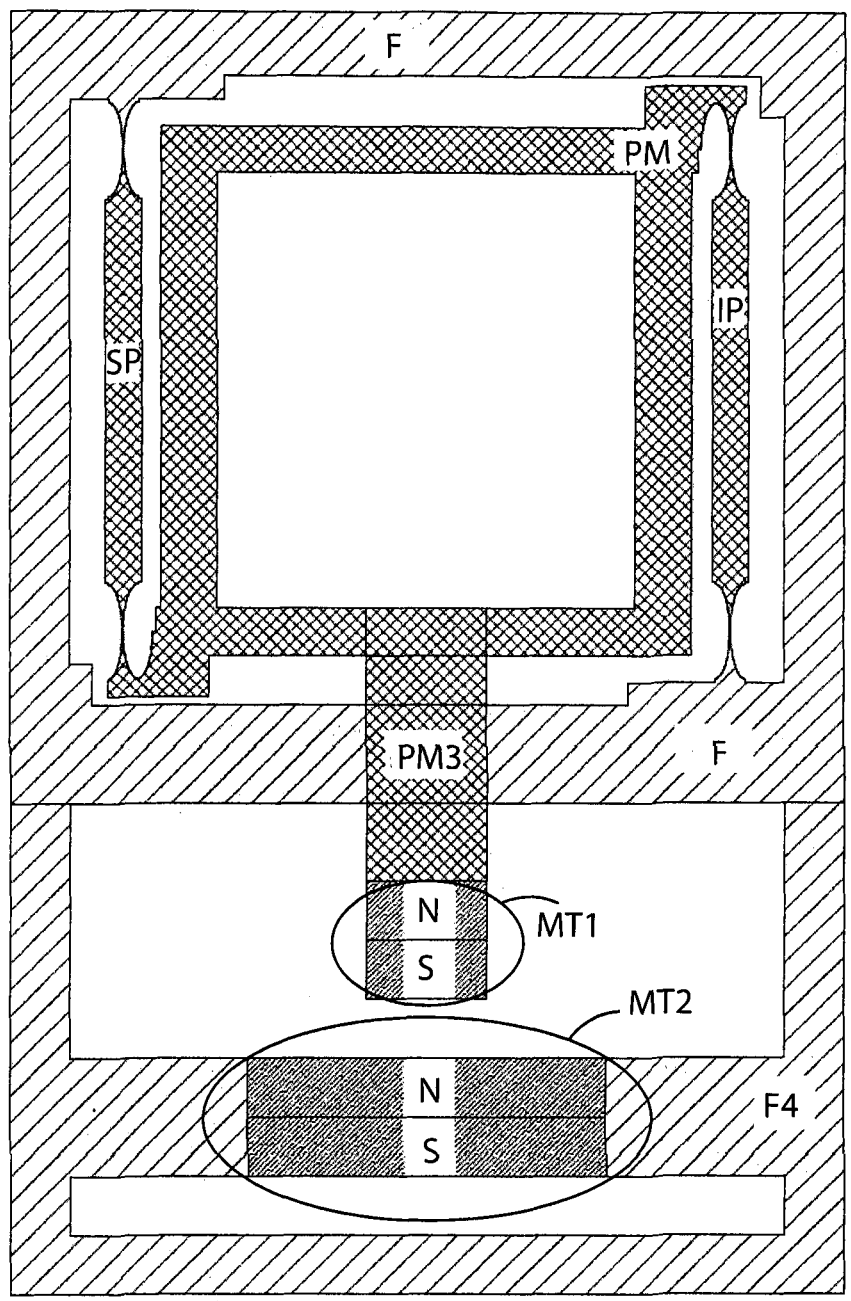
Figure 6:
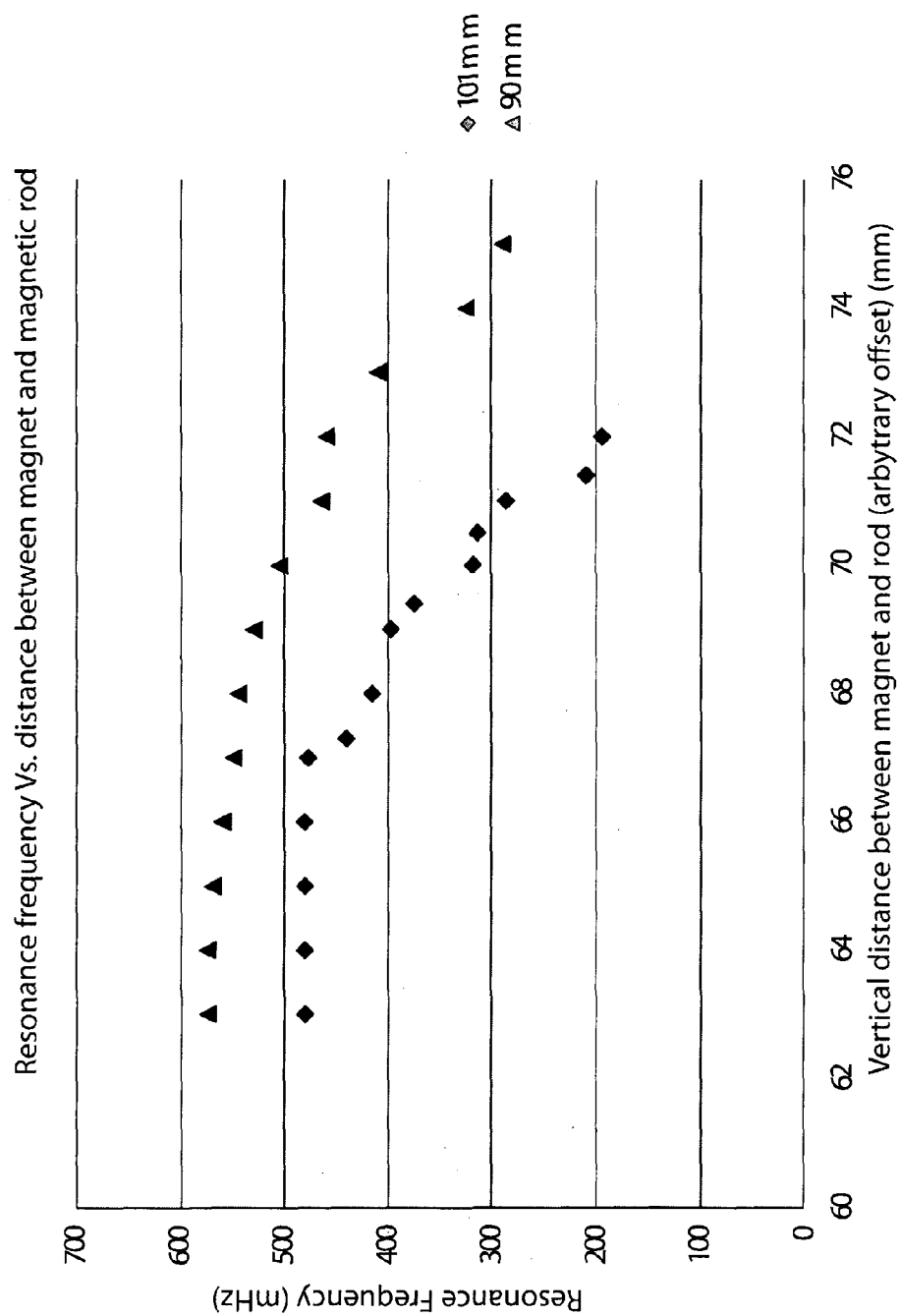
Figure 7:
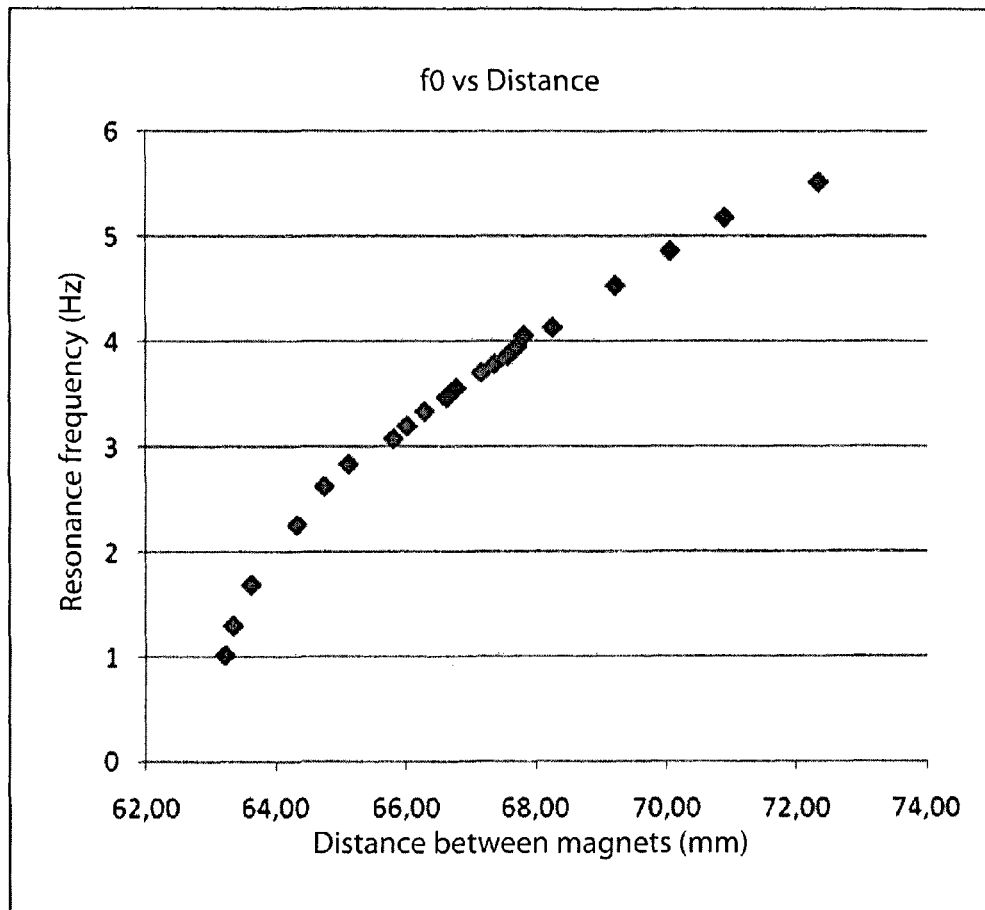
Figure 8:
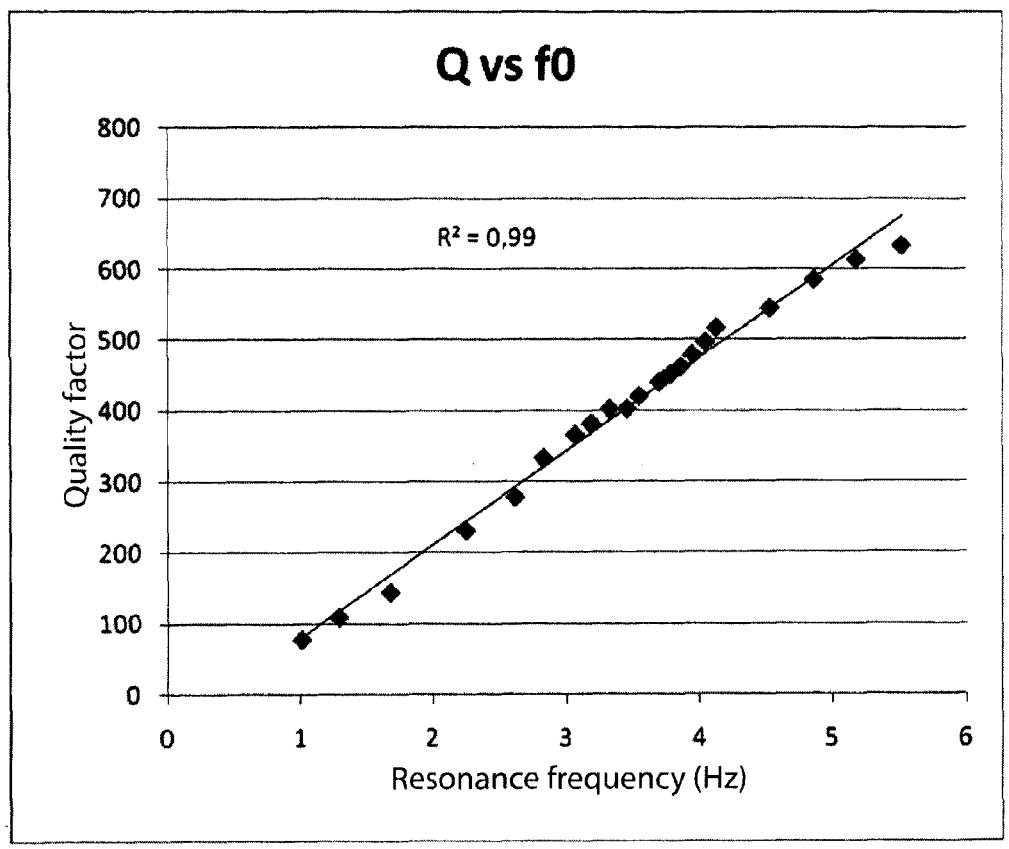

FIG. 3 shows a side view scheme of the horizontal monolithic folded pendulum as described in [7] [8] (whereon 4 among the total 8 joints are visible) positioned vertically (by rotating it of 90° in the anticlockwise direction), utilized for the tests of the present invention, by applying on it:
a) a constant attractive magnetic force between the side support of the sensor and the central mass generated by permanent magnets MC1, MC2 applied by means of connection PM2 laterally on the support F and to the central mass PM (for the calibration of the natural resonance frequency of the sensor);
b) a constant repulsive magnetic force between the sensor's base and the central mass PM generated by means of permanent magnets MG1, MG2 applied by means of connection PM1 to the base of support F and to the central mass PM (such force is needed to compensate the local gravity force and to center the central mass PM of the sensor to the centre of support F);

FIG. 4 shows a principle scheme of the folded pendulum of FIG. 1 rotated by an angle in the anticlockwise direction;

FIG. 5 shows a side view scheme of the horizontal monolithic folded pendulum as described in [7] [8] (whereon 4 among the total 8 joints are visible), utilized for the tests of the present invention, whereon an attractive magnetic force has been applied between the base of the sensor and the central mass PM generated by a permanent magnetic configuration MT1, MT2 applied to the support F by connections PM3 and to the central mass PM;

FIG. 6 shows the progression of the natural resonance frequency of the horizontal monolithic folded pendulum in the air as a function of the relative distance between the permanent magnets applied to the support and to the central mass, for two positions of the fixed magnet on the central mass, 101 mm e 90 mm, with arbitrary offset;

FIG. 7 shows the progression of the natural resonance frequency of the vertical monolithic folded pendulum in the air as a function of the relative distance module between the permanent magnets applied to the support and to the central mass;

FIG. 8 shows the progression of the quality factor of the monolithic vertical folded pendulum in the air as a function of the resonance frequency obtained by variation of the relative distance between the permanent magnets applied to the side support and the central mass: the data show a linear progression (correlation coefficient equal to 0.99) as foreseen by the theory of an oscillator in presence of viscous friction, due mainly to the air present between the pendulum, the inverted pendulum and the central mass.

WORKING PRINCIPLE OF THE INVENTION

The innovation principle of the folded pendulum in vertical configuration with low resonance frequency and high mechanical quality factor, and oscillations (e.g. seismic) sensor and vertical dumping system utilizing such a folded pendulum stems has its origin in the model of original monolithic seismic sensor "folded pendulum", as described in [5], and the subsequent and effective developments and improvements of the modeling and technology described in [6], also by means of an innovative realization that has already lead to the international patent application for a horizontal folded pendulum [7] [8].

As it will be described in detail in the following, such a folded pendulum in vertical configuration has been invented thanks to a totally innovative interpretation and never discussed in literature of the equations describing the behavior of the horizontal folded pendulum as known in literature [4-8].

The validity of such interpretation of the model and the mathematical formulation of the new model describing it has been reduced to practice by one of the possible experimental embodiments of the same, which by the way wholly verifies the model whereon the subject invention is based. The attained scientific and technological results and described in the following allow to verify the paving of a scientific and technological way for the realization of compact vertical seismic sensors with low frequency very high sensitivity and poor sensitivity to ambient noises.

Starting point of the description of the low-frequency vertical folded pendulum is that of the principle configuration, the Watts pendulum ("folded pendulum"), well known in literature, such to provide a resonance frequency theoretically equal to zero with any small dimensions, even if during the practical realization mechanical and sensitivity factors intervene which put a lower, limit to the resonance frequency. In the following the horizontal folded pendulum model will be described, such a model being a basic element for the vertical folded pendulum model.

A precise description of the dynamics of a horizontal folded pendulum is given by the Lagrangian model developed by Liu et al. [4], based on the mechanical scheme described in FIG. 1. The mechanical scheme consists in two vertical arms (connected to an only support F), a pendulum (which is also called simple pendulum SP in the following) of length $l_p$ and mass $m_p$, and an inverted pendulum (which is also called inverted pendulum IP in the following), of length $l_{ip}$ and mass $m_{ip}$, connected to each other by a rigid central mass (which is also called test mass PM in the following), $m_c$. The distance between the rotation points of the central mass is fixed and equal o $I_d$. In the model of Liu et al. [4], the two vertical arms are modeled as concentrated equivalent masses positioned in their geometrical centre, wherefrom it stems that $l_{b_1}=l_p/2$ for the pendulum and $l_{b_2}=l_{ip}/2$ for the inverted pendulum, approximations well justified by the mechanical realizations of all the realized prototypes. The central mass, $m_c$, is, instead, modelized as two concentrated equivalent masses, $m_{c_1}$ and $m_{c_2}$, being ($m_c=m_{c_1}+m_{c_2}$), positioned in the points of rotation of the central mass at distances $l_{c_1}$ and $l_{c_2}$, respectively. The insertion of a calibration mass, $m_t$ (which is also called calibration mass CM in the following) at a distance $l_t$ from the pendulum-central mass rotation point, increases the values of the equivalent masses $m_{c_1}$ and $m_{c_2}$ by fractions of the calibration mass, with amounts depending on the position of $l_t$ of $m_t$, on the basis of the relations [6]:

$$m_{c_{1_{new}}} = m_{c_{1_{old}}} + m_t\left(1 - \frac{l_t}{l_d}\right) \quad m_{c_{2_{new}}} = m_{c_{2_{old}}} + m_t\frac{l_t}{l_d} \quad (1)$$

Allowing, as one will see in the following, to vary the value of the resonance frequency of the same folded pendulum.

In particular, assuming equal length for the two vertical arms, ($l_b=l_{b_1}=l_{b_2}$), and equal distances of the rotation points of the central mass, ($l_c=l_{c_1}=l_{c_2}$), hypothesis confirmed by the monolithic folded pendulum prototypes, then for small angles of rotation of the pendulums arms, the potential energy can be approximated by:

$$U = \left\{ \frac{(m_{b_1} - m_{b_2})gl_b}{2} + \left[ (m_{c_1} - m_{c_2}) + m_t\left(1 - \frac{2l_t}{l_d}\right) \right] gl_c + k_\theta \right\} \theta^2 \quad (2)$$

wherein θ is the rotation angle and $k_\theta$ is the total angular elastic constant of the joints. As a consequence, the resonance frequency of the folded pendulum, $f_o$, is expressed by [8]:

$$f_o = \frac{\omega_o}{2\pi} = \quad (3)$$

$$\frac{1}{2\pi}\sqrt{\frac{\left[(m_{b_1} - m_{b_2})\frac{l_b}{2l_c} + (m_{c_1} - m_{c_2}) + m_t\left(1 - \frac{2l_t}{l_d}\right)\right]\frac{g}{l_c} + \frac{k_\theta}{l_c^2}}{(m_{b_1} + m_{b_2})\frac{l_b^2}{3l_c^2} + (m_{c_1} + m_{c_2}) + m_t}} =$$

$$\frac{1}{2\pi}\sqrt{\frac{K_{g_{eq}} + K_{e_{eq}}}{M_{eq}}} = \frac{1}{2\pi}\sqrt{\frac{K_{eq}}{M_{eq}}}$$

wherein $\omega_o$ is the resonance angular frequency, $K_{eq}$ is the equivalent elastic constant, which is the sum of the equivalent gravitational linear elastic constant, $K_{g_{eq}}$, $$K_{g_{eq}} = \left[(m_{b_1} - m_{b_2})\frac{l_b}{2l_c} + (m_{c_1} - m_{c_2}) + m_t\left(1 - \frac{2l_t}{l_d}\right)\right]\frac{g}{l_c} \quad (4)$$

And the equivalent elastic constant, $K_{e_{eq}}$, $$K_{e_{eq}} = \frac{k_\theta}{l_c^2} \quad (5)$$

Whilst the equivalent mass, $M_{eq}$, is expressed by:

$$M_{e_{eq}} = (m_{b_1} + m_{b_2})\frac{l_b^2}{3l_c^2} + (m_{c_1} + m_{c_2}) + m_t \quad (6)$$

The equation (3) allows the determination of another important parameter for the design of the horizontal folded pendulum, the sensitivity to calibration, $S_{f_o}$, fundamental to guarantee an easy and stable calibration of the resonance frequency, $f_o$. An analytic expression for $S_{f_o}$ is obtained by deriving the equation (3) with respect to the position of the calibration mass, $l_c$ [8]

$$S_{f_o} = \frac{df_o}{dl_t} = \frac{g}{2\pi l_c l_d}\frac{m_t}{\sqrt{M_{eq}(m_t)K_{eq}}} \quad (7)$$

This equation shows that the sensitivity of the calibration of the horizontal folded pendulum, besides an obvious dependency from the geometric parameters of the folded pendulum, is as a matter of fact directly proportional to the value of the calibration mass, $m_t$. It is here noted that the relationships describing the behavior of such folded pendulum have been derived by considering the gravity acceleration, g, always present and constant, since such a folded pendulum has been developed and used for fixed positions in the terrestrial gravitational field. Applications of the system subject-matter of the present invention in the space, wherein there is no gravitational field, do not modify in principle the claims of this invention, in particular concerning the calibration technique that will be described in the following.

Equation (3) shows also the limits of its use. Indeed, in the absence of gravitational field (i.e. even with compensated gravitational field), the equivalent gravitational constant, $K_{g_{eq}}$, vanishes because it becomes the gravitational acceleration, g, vanishes. Therefore the (3) reduces to:

$$f_o = \frac{\omega_o}{2\pi} = \frac{1}{2\pi}\sqrt{\frac{\frac{k_\theta}{l_c^2}}{(m_{b_1} + m_{b_2})\frac{l_b^2}{3l_c^2} + (m_{c_1} + m_{c_2}) + m_t}} = \frac{1}{2\pi}\sqrt{\frac{K_{e_{eq}}}{M_{eq}}} \quad (8)$$

Wherefrom one deduces that, in the absence of gravity, the folded pendulum loses all its main tunability features, possibility of realizing low resonance frequencies, etc., being as a matter of fact limited by the rotational elastic constants of the joints that cannot be compensated in no way.

One of the key element, that constitutes one of the novelty elements introduced in the framework of the invention, is that of acting on the value of the equivalent gravitational linear elastic constant, $K_{g_{eq}}$, applying a constant external force parallel (additive and subtractive) to the gravity force, whose geometrical direction is perpendicular to the tangent to the motion of the horizontal folded pendulum central mass in the point of minimum potential.

To this end, it is, not important the typology of such a force (magnetic, electromagnetic, electrostatic, etc.), rather its constancy during time, needed to generate a local conservative field similar to the terrestrial gravitational field, but having a value determined in the design phase. The typology of the force becomes, instead, important to the end of evaluating of the coupling of such force, and hence of the horizontal folded pendulum, with external ambient noises.

It is important to precise that, in line of principle, such force does not have necessarily to act concurrently on all the moving mechanical components of the folded pendulum (pendulum, inverted pendulum, central mass and calibration mass), but can also be realized so as o act on a single component, if this results technically more convenient for is realization and for the required applications.

The application, for example, of a constant force to the central mass of the sensor, that can be dynamically described by an acceleration, $a_{est}$, modifies the expression of the resonance frequency (3) into $$f_o = \quad (9)$$

$$\frac{\omega_o}{2\pi} = \frac{1}{2\pi}\sqrt{\frac{\left[(m_{b_1} - m_{b_2})\frac{l_b}{2l_c} + (m_{c_1} - m_{c_2}) + m_t\left(1 - \frac{2l_c}{l_d}\right)\right]\frac{g_{eq}}{l_c} + \frac{k_\theta}{l_c^2}}{(m_{b_1} + m_{b_2})\frac{l_b^2}{3l_c^2} + (m_{c_1} + m_{c_2}) + m_t}}$$

wherein $g_{eq} = g + a_{est}$ is the equivalent gravitational acceleration, sum of the gravitational acceleration, g, and the external acceleration, $a_{est}$, generated by the applied constant external forces. This relationship allows to verify that it is possible to vary the resonance frequency of the system, with a simple variation of the amplitude of the applied external force, without any mechanical intervention on the folded pendulum.

It is to be noted in the expression (9) of the model that the effect of the application of an external force to the central mass has been propagated also to the masses of the arms and of the calibration mass. Indeed, in such a model the joints have been considered longitudinally inextensible (in traction and in compression) so that the force applied to the central mass is considered, on the basis of this hypothesis, applied in an identical way to the masses of the pendulum arms and the calibration mass. More accurate models could only improve the precision of the determination of the resonance frequency of the folded pendulum, but, as a matter of fact, do not modify the substance of the principle whereon this invention is based.

It is evident that this type of configuration renders wholly usable the folded pendulum in the horizontal configuration even for applications in the absence of gravity (for example in space application of the inverted pendulum), because acceleration, $a_{est}$, generated by the applied constant external force, compensate in a controlled way the absence of the gravitational acceleration, g.

By the way, a variation of the gravitational acceleration, $g_{eq}$, has a direct effect on the value of the resonance frequency, as one can verify fro relationship (3). Such an effect can be quantified by the expression of the sensitivity of the natural oscillation frequency to the variations of the constant $g_{eq}$, given by $$S_{f_o} = \frac{df_o}{dg_{eq}} = \frac{1}{8\pi^2} \frac{K_{g_{eq}}}{f_o M_t} \quad (10)$$

The introduction of a constant force, which is also claimed in the present invention for its implications and structural modifications even in the realization of the horizontal folded pendulum, becomes the fundamental element for the realization of vertical folded pendulums, which are an absolute novelty, not having never been realized and discussed in the literature. Indeed, as one will demonstrate in the following, such an innovation allows to re-create the same working conditions of a horizontal folded pendulum, keeping all the peculiar features that distinguish it from the other configurations and that are its points of force, among which, in particular, we recall: low resonance frequencies, compact solutions as the monolithic ones and most reduced coupling of the measurement degree of freedom with respect to the other degrees of freedom [5-8].

The base structure of the vertical folded pendulum, subject-matter of the invention, is that of a horizontal pendulum rotated in the clockwise (or anticlockwise) direction of 90° for which the same working conditions of the horizontal pendulum are reproduced (FIG. 3).

In the vertical configuration, the central mass is obliged to have a purely vertical movement. The rotation, however, by 90° of the folded pendulum modifies the effect of the action of the gravitational acceleration, g. Indeed, the latter does not act in the direction perpendicular to motion any longer, rather in the direction parallel to the motion of the central mass.

As one sees from FIG. 3, the central mass assumes a position of vertical equilibrium, defined by the equation that regulates its static position. This position, assuming in first approximation joins characterized by identical angular elastic deformation coefficient, can be defined by a global elastic constant, $K_\theta$, which takes into account both the elastic constants and the geometrical form of the system, and by means of a total mass, $M_t$, that is the sum of all the masses (pendulum, inverted pendulum, central mass and calibration mass), by means of the classical relationship:

$$\frac{M_t g l_c}{2} + K_\theta \theta_o = 0 \quad (11)$$

This relationship provides the angle $\theta_o$ wherein the vertical pendulum is statically positioned. In other respects, taking into account that the elastic constants of the joints have generally very small values (this is due to the fact that, mainly in the monolithic realizations, the joints are generally very thin to the end of reaching very low resonance frequencies and effect comfortable and effective calibrations, mainly at low frequencies), generally the central mass collapses on the frame, invalidating the functioning of the folded pendulum. However, dealing with a purely static positioning, it is possible to configure back the folded pendulum in the static configuration generally centered of a horizontal folded pendulum in two different ways, but equally effective, whose application depends on the values of the masses constituting the pendulum.

The first way consists in an external force parallel to the gravity force, which compensates it (or, with lower effectiveness, from the point of view of the dynamics of the sensor, partially).

Such a force can be applied, for example, to the central mass, being technically the most convenient choice. Also in this case, the typology of such a force (magnetic, electromagnetic, electrostatic, etc.) is not important, rather its constancy along time, needed to generate a local conservative field similar and opposed to the terrestrial gravitational field. The typology of the force is, instead, even in this case, important to the end of evaluating couplings of such force, and therefore of the folded pendulum, with external ambient noises. In this case the angle, $\theta_o$, reduces to $\theta_o=0$, and the folded pendulum assumes exactly the same static geometric configuration that it would assume if positioned in the horizontal configuration (FIG. 3).

The second way consists in the realization of a configuration of vertical folded pendulum by means of pre-bending of the joints, obtained by rotation of the same. To this end, one uses the value of the rotational elastic force generated by the torsion of the joints of the folded pendulum. The joints are designed and realized in such a way that the weight of the central mass, calibration mass, pendulum and inverted pendulum are exactly balanced by the generated torsion momentum, in such a way that that the central mass will be positioned exactly in the static geometrical position that it would assume if the folded pendulum were positioned in horizontal configuration. This configuration, though more difficult to realize because it needs very precise evaluations in the sensors design and realization phase, is as a matter of fact insensible to the effects of vertical ambient noises.

In view of what has been previously demonstrated and the assumptions previously made, even for the vertical folded pendulum positioned in its geometrical equilibrium position, for small rotation angles of the pendulums arms, the potential energy can be approximated by:

$$U = \left\{ \frac{(m_{b_1} - m_{b_2})gl_b}{2} + \left[ (m_{c_1} - m_{c_2}) + m_t \left(1 - \frac{2l_t}{l_d}\right) \right] l_c a_{est} + k_\theta \right\} \theta^2 \quad (12)$$

wherein $\theta$ is the rotation angle, $k_\theta$ is the total angular elastic constant of the joints and $a_{est}$ is the external acceleration generated by the applied constant external forces, applied for example to the central mass and for which all the hypothesis and considerations previously carried out hold, which concern the accuracy of the model, but which do not modify the substance of the principle on which the invention is based.

It follows that the resonance frequency of the vertical folded pendulum, $f_v$, is described by a relationship structurally analogous to that of the horizontal pendulum (equation (9)), wherein the equivalent gravitational acceleration reduces to the only external acceleration:

$$f_v = \frac{\omega_v}{2\pi} = \qquad (13)$$

$$\frac{1}{2\pi}\sqrt{\frac{\left[(m_{b_1}-m_{b_2})\frac{l_b}{2l_c}+(m_{c_1}-m_{c_2})+m_t\left(1-\frac{2l_t}{l_d}\right)\right]\frac{a_{est}}{l_c}+\frac{k_\theta}{l_c^2}}{(m_{b_1}+m_{b_2})\frac{l_b^2}{3l_c^2}+(m_{c_1}-m_{c_2})+m_t}} =$$

$$\frac{1}{2\pi}\sqrt{\frac{K_{a_{eq}}+K_{e_{eq}}}{M_{eq}}} = \frac{1}{2\pi}\sqrt{\frac{K_{v_{eq}}}{M_{eq}}}$$

Wherein $\omega_v$ is the vertical angular resonance frequency, $M_{eq}$ is the equivalent mass and $K_{v_{eq}}$ is the equivalent vertical elastic constant, that is the sum fo the equivalent elastic constant $K_{e_{eq}}$ of the joints and the equivalent linear elastic constant of the external forces, $K_{a_{eq}}$, $$K_{a_{eq}} = \left[(m_{b_1}-m_{b_2})\frac{l_b}{2l_c}+(m_{c_1}-m_{c_2})+m_t\left(1-\frac{2l_t}{l_d}\right)\right]\frac{a_{est}}{l_c}. \qquad (14)$$

Similarly to what has been done for the horizontal folded pendulum, even for the vertical pendulum it is possible to define an expression that quantifies its sensitivity to calibration, $S_{f_v}$, fundamental to guarantee an easy and stable calibration of the frequency, $f_v$, obtained by deriving the equation (13) with respect to the position of the calibration mass, $l_c$, $$S_{f_v} = \frac{df_v}{dl_t} = \frac{a_{est}}{2\pi l_c l_d}\frac{m_t}{\sqrt{M_{eq}(m_t)K_{v_{eq}}}} \qquad (15)$$

This equation shows that the sensitivity of the calibration of the folded pendulum, besides an obvious dependency on the geometrical parameters of the folded pendulum, is as, a matter of fact directly proportional to the value of the calibration mass, $m_t$, and the value of the external acceleration, $a_{est}$.

Instead, the sensitivity of the resonance frequency, $f_v$, to the variations of the acceleration generated by the applied external static forces, $a_{est}$, is given by $$S_{f_v} = \frac{df_v}{da_{est}} = \frac{1}{8\pi^2}\frac{K_{v_{eq}}}{f_v M_t} \qquad (16)$$

A folded pendulum rotated by any angle comprised between 0° (horizontal folded pendulum) and 90° (vertical folded pendulum) can be as a matter of fact always modeled by combining the behaviors of a horizontal pendulum and a vertical pendulum. Indeed, the rotation, by a generic angle α, of the external frame with respect to the horizontal plane modifies the direction of action of the gravitational acceleration, g.

The gravitational acceleration, g, can be, therefore, decomposed into two components, a component perpendicular to the motion of the central mass, $g_\alpha$=g·cos α, and a component parallel to the motion of the central mass, $g_\beta$=g·sin α (FIG. 4).

For a correct functioning of the rotated folded pendulum, or at least to maximize its dynamics, the component of g parallel to the motion of the central mass, $g_\beta$, can be compensated statically in a way analogous to what previously described for the folded pendulum in the vertical configuration. Indeed, dealing with a purely static positioning, it is possible to configure back the folded pendulum in the centered static configuration by application of an external force parallel to the component $g_\beta$ of the gravity force, which compensates it totally (or, with lower effectiveness, from the point of view of the sensor dynamics, partially) or by means of realization of a configuration of folded pendulum by pre-bending of the joints, obtained by rotation of the same.

The resonance frequency of the rotated folded pendulum is described, instead, always by equation (9), with the equivalent gravitational acceleration given by:

$$g_{eq}=g_\alpha+a_{est}. \qquad (17)$$

Hence, having defined the equivalent gravitational acceleration by means of equation (17), the model of the folded pendulum as rotated by any angle between 0° and 90°, in the clockwise or anticlockwise direction, is described in a complete way by the equations from equation (9) to equation (16).

Experimental Realization of the Invention

The basic scheme utilized for the realization of the prototype of vertical folded pendulum is identical to the classic one for a monolithic horizontal folded pendulum, as described in literature [5-8], constituted substantially by a simple pendulum, an inverted pendulum and a rod connecting the oscillating ends of such pendulums [6].

The monolithic implementation of such a folded pendulum has been chosen to the end of realizing a pendulum of reduced dimensions, wholly scalable, not much sensible to the ambient noises and with low thermal noise, in particular at low frequency [5-8] [18]. Moreover, being all the mechanical components (oscillating parts and joints) realized by means of working by electro-erosion cutting of an only block of material, the thermal noise, generated as a matter of fact by the joints, is, as a matter of fact, minimized [6] [18].

In the figures, reference F refers to the frame, reference PM to the test mass, reference IP to the inverted pendulum and reference SP to the simple pendulum, G instead refers to a generic joint. To the test mass PM a further mass CM can be added, which has not been produced starting from the same monolithic block and is called calibration mass, to be utilized for the calibration of the system in frequency (variation of the natural resonance frequency).

Figure 2:
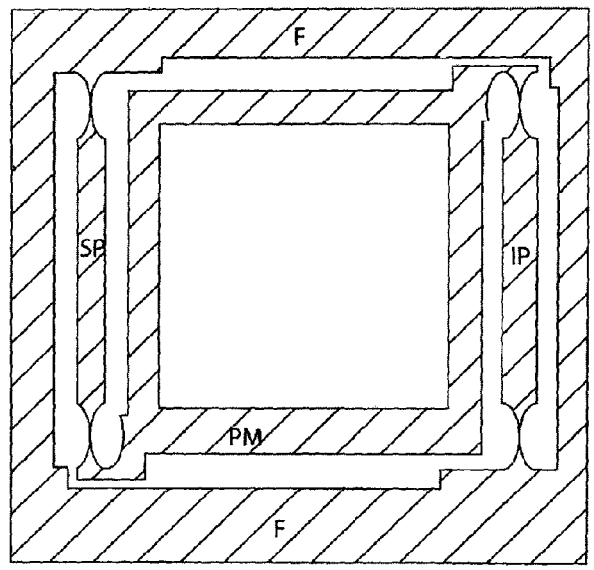
FIG. 2 shows a side view scheme of the horizontal monolithic folded pendulum as described in [7] [8] (whereon 4 among the total 8 joints are visible), utilized for the tests.

The so composed system needs 4 flexible joints. Each of the joints has been realized in pair (for a total amount of 8 joins), to the end of limiting the torsional effects in the same joints and, therefore, minimize the coupling between horizontal transversal and longitudinal degrees of freedom (FIG. 2, FIG. 3 and FIG. 5). Such joints, respectively connect:
  an end of the simple pendulum and the frame supporting it;
  the oscillating end of the simple pendulum and an end of the connection rod between pendulums;
  the other end of the connection rod and the oscillating end of the inverted pendulum;
  the end of the inverted pendulum and the structure supporting the folded pendulum.

The prototype of monolithic sensor, as shown in FIG. 2, has been realized starting from an Aluminum block (Alloy 7075-T6) of 134 mm×140 mm×40 mm by precision mechanical workings. The electro-erosion technique (EDM) has been used to separate the pendulum arm, the inverted pendulum arm and the central mass from the support. Also the four joints have been realized by means of electro-erosion cutting, utilizing a thin cut of 250 µm. Such joints are realized with elliptic profile of minimum thickness of 100 µm with a ellipticity ration equal to 16/5. The arms of the pendulums (of length 81.5 mm, thickness 102 mm, spaced apart by 3.50 mm from the central mass and the support) are designed to minimize mass and inertia momentum without loosing rigidity and symmetry. Indeed, the best results, in terms of low resonance frequency and respective high value of the mechanical quality factor together with compact dimensions of the system, have been obtained by Barone et al. [8]. The utilization of joints of elliptic type, besides guaranteeing high quality factors for the monolithic realizations, most of all at low frequency, confers a suitable robustness of the joint, the reduced dimensions of its profile notwithstanding. Obviously a number of other geometrical configurations of the joints can be utilized, with different functionality and features, even in relation to the introduced thermal noise, that constitutes in line of principle the ultimate limit for the sensitivity of the same sensor [18] [19].

Obviously, in the configuration in which such a folded pendulum is rotated by 90° with respect to the vertical in the clockwise (or anticlockwise) direction, one could not, in line of principle, speak about a pendulum and inverted pendulum for the pendulum arms supporting the central mass, owing to the fact that the gravitational acceleration acts transversally to such arms. These arms assume in any case again their function when the applied external acceleration, $a_{est}$, is present.

The static positioning of the sensor and the introduction of an external horizontal force acting on the central mass in an attractive way (generating th external acceleration, $a_{est}$) has been obtained by application of magnetic forces, as previously described.

To the end of evaluating the effectiveness and functionality of the model, two series of measurements have been performed.

To the end of demonstrating the feasibility and compliance of the horizontal calibration procedure, a prototype of horizontal folded pendulum has been utilized in the version with four joints in traction and four joints in compression [7] [8] (FIG. 2). Obviously, and without any loss of generality, any realization of folded pendulum can be used. To the central mass of this prototype an attractive constant magnetic force has been applied between the base of the sensor and the central mass, generated by a configuration with two permanent magnets applied between the support and the central mass (FIG. 4).

The results describing the effects of the variation of the resonance frequency as a function of the value of the applied external acceleration, $a_{est}$, by introduction of a constant magnetic field, for the horizontal folded pendulum in the air, are given in FIG. 6. Such results demonstrate the whole functionality of the invention to the end of calibrating of the resonance frequency of the horizontal folded pendulums.

To the end of experimentally demonstrate the feasibility of a vertical folded pendulum the prototype of horizontal folded pendulum has been utilized in the version with four joints in traction and four joints in compression [7] [8] (FIG. 3).

By applying what has been described in the previous section, and setting up in a suitable way the distance between the magnet at the base of the sensor and that positioned on the central mass, which work in repulsion, the central mass has been statically positioned in centered position.

Subsequently, the distance between the magnet positioned on the central mass and that positioned laterally on the external support of the sensor, which instead work in attraction, has been varied, varying in such a way the natural resonance frequency of the sensor, as described and foreseen by the model described in the previous section.

The results are given in FIG. 7 (resonance frequency as a function of the distance between the horizontal magnets) and 8 (quality factor as a function of the resonance frequency), from which one derives the perfect compliance and functionality of the invention here described.

BIBLIOGRAPHY

[1] "Prospects for Low-Frequency Seismometry", Report of the IRIS Broadband Seismometer Workshop, S. Ingate and J. Berger Editors, Granlibakken, Calif. (USA), Mar. 24-26 (2004).

[2] A. Bertolini, N. Beverini, G. Cella, R. DeSalvo, F. Fidecaro, M. Francesconi, D. Simonetti, "Geometric anti-spring vertical accelerometers for seismic monitoring", Nuclear Instruments and Methods A 518, 233-235 (2004).

[3] J. Hayskov, G. Alguacil, "Instrumentation in earthquake seismology", preliminary version, June 2002, 46-51 (2002).

[4] J. Liu, L. Ju, D. G. Blair, "Vibration isolation performance of an ultra-low frequency folded pendulum resonator", Physics Letters A 228, 243-349 (1997).

[5] A. Bertolini, R. DeSalvo, F. Fidecaro, M. Francesconi, S. Marka, V. Sannibale, D. Simonetti, A. Takamori, H. Tariq, "Mechanical design of a single-axis monolithic accelerometer for advanced seismic attenuation systems", Nuclear Instrument and Method 556, 616-623 (2006).

[6] F. Acernese, R. De Rosa, G. Giordano, R. Romano, F. Barone, "Mechanical monolithic horizontal sensor for low frequency seismic noise measurement", Review of Scientific Instruments 79, 074501-1, ISSN:0034-6748, doi: 10.1063/1.2943415 (2008).

[7] F. Barone, G. Giordano, "Folded pendulum a bassa frequenza con elevato fattore di quanta meccanico, e sensore sismico utilizzante tale folded pendulum", Domanda di brevetto italiana No. RM2009000348, dep. il 07.07.2009 (2009).

[8] F. Acernese, R. De Rosa, G. Giordano, R. Romano, S. Vilasi, F. Barone, "New tunable mechanical monolithic horizontal seismometer for low frequency seismic noise measurement", Proceedings of SPIE Vol. 7647, 76472X-1, doi:10.1117/12.846356 (2010).

[9] F. Acernese, R. De Rosa, G. Giordano, R. Romano, F. Barone, "Tunable mechanical monolithic sensor with interferometric readout for low frequency seismic noise measurement", Nuclear Instruments and Methods in Physics Research A 617, 457, doi:10.1016/j.nima.2009.10.112 (2010).

[10] F. Acernese, R. De Rosa, F., Garufi, G. Giordano, R. Romano, F. Barone, "Tunable mechanical monolithic horizontal sensor with high Q for low frequency seismic noise measurement", Journal of Physics: Conference Series 228, 012035, doi:10.1088/1742-6596/228/1/012035 (2010).

[11] F. Acernese, R. De Rosa, G. Giordano, R. Romano, S. Vilasi, F. Barone, "Tunable mechanical monolithic horizontal accelerometer for low frequency seismic noise measurement", Proceedings of SPIE Vol. 7292, 72922J-1, doi: 10.1117/12.814106 (2009).

[12] F. Barone, F., "Low-noise, mechanical, monolithic seismic sensors", SPIE Newsroom, p. 1-2, doi: 10.1117/2.1200907.1742 (2009).

[13] F. Acernese, R. De Rosa, G. Giordano, R. Romano, F. Barone, "Tunable mechanical monolithic horizontal accelerometer for low frequency seismic noise measurement", Proceedings of SPIE Vol. 7478, 74782R-1, doi: 10.1117/12.830259 (2009).

[14] F. Acernese, G. Giordano, R. Romano, R. De Rosa, and F. Barone, "Mechanical monolithic accelerometer for suspension inertial damping and low frequency seismic noise measurement", Journal of Physics, Conference Series (on line), Vol. 122, 012012-1, ISSN:1742-6596, doi:10.1088/1742-6596/122/1/012012 (2008).

[15] F. Acernese, R. De Rosa, G. Giordano, R. Romano, F. Barone, "Tunable mechanical monolithic accelerometer for low frequency seismic noise measurement", Proceedings of SPIE Vol. 7110, 711011-1, doi:10.1117/12.800429 (2008).

[16] F. Acernese, R. De Rosa, G. Giordano, R. Romano, F. Barone, "Tunable mechanical monolithic sensor with interferometric readout for low frequency seismic noise measurement", Proceedings of SPIE Vol. 6932, 69320K-1, doi:10.1117/12.772196 (2008).

[17] G. Giordano, "Development and test of tunable mechanical monolithic horizontal accelerometer for low frequency seismic noise measurement", Tesi di Dottorato in "Rischio Sismico", University degli Studi di Napoli "Federico II" (2008).

[18] P. R. Saulson, "Thermal noise in mechanical experiments", Physical Review D—Particles and Fields 42, 2437-2445 (1990).

[19] T. Stuart, et al. (1997) "Elliptical flexure hinges", Review of Scientific Instruments, 68 (3).

[20] Y. M. Tseytlin, "Notch flexure hinges: an effective theory", Review of Scientific Instruments 73, 3363-3368 (2002).

In the foregoing, preferred embodiments and aspects of the invention have been described and variations to the present invention have been suggested, but it is to be understood that those skilled in the art will be able to modify and apply changes without departing from the relevant scope, as defined in the enclosed claims.

The invention claimed is:

1. A folded pendulum with tunable oscillation frequency, comprising:
   a support;
   a test mass;
   a simple pendulum; and
   an inverted pendulum; wherein
   the simple pendulum and the inverted pendulum being connected at one of their ends to the test mass and at the other end to the support by means of four corresponding joint systems, the test mass being not connected to the support and being therefore free to oscillate,
   with reference to an equilibrium static position, the simple pendulum and the inverted pendulum are positioned substantially along a disposition direction perpendicular to a tangent to motion of the test mass in a point of geometrical centering with respect to the support;
   a first means for applying a first constant external force in one or more points of the simple pendulum, and/or the inverted pendulum and/or the test mass, in a direction of the tangent to the motion of the test mass in the point of geometrical centering with respect to the support; and
   a second means for applying a second constant external force along said disposition direction in one or more points of the simple pendulum, and/or the inverted pendulum and/or the test mass, to generate a local conservative field of a pre-defined value,
   an oscillation frequency of the folded pendulum being a function of said second external force.

2. The folded pendulum according to claim 1, wherein, under gravity conditions, and with the folded pendulum rotated of an angle α with respect to a gravity force g, said first constant external force is parallel to a component $g_\beta$ of the gravity force parallel to the motion of the central mass, and is such to compensate at least partially said component $g_\beta$, whilst said second constant external force is parallel to the component $g_\alpha$ of the gravity force that is perpendicular to the component $g_\beta$.

3. The folded pendulum according to claim 1, wherein junction systems relevant to the simple pendulum comprise each of one or more joints in tension with respect to said second constant external force, and joint systems relevant to the inverted pendulum comprise each of one or more joints in compression with respect to said second constant external force.

4. The folded pendulum according to claim 1, wherein said first constant external force is obtained mechanically by pre-bending the joints, by rotation of the same, during a production phase.

5. The folded pendulum according to claim 1 wherein said first constant external force is a magnetic force that acts on the test mass.

6. The folded pendulum according to claim 1, wherein said second constant external force is a magnetic force acting on the test mass.

7. A folded pendulum with tunable oscillation frequency, comprising:
   a support;
   a test mass;
   a simple pendulum;
   an inverted pendulum; wherein
   the simple pendulum and the inverted pendulum being connected at one of their ends to the test mass and at the other end to the support by means of four corresponding joint systems, the test mass being not connected to the support and being therefore free to oscillate, the joint systems relevant to the simple pendulum comprising one or more joints in tension, the joint systems relevant to the inverted pendulum comprising one or more joints in compression, and
   a means for applying a constant external force in one or more points of the simple pendulum, and/or the inverted pendulum and/or the test mass, in a direction perpendicular to motion of the test mass in a point of geometrical centering with respect to the support;
   an oscillation frequency of the folded pendulum being a function of said external force.

8. The folded pendulum according to claim 7, wherein said constant external force is a magnetic force acting on the test mass.

9. The folded pendulum according to claim 1, wherein the folded pendulum is formed from a monolithic block of material, suitably machined.

10. The folded pendulum according to claim 9, wherein the monolithic block is cut-machined by electro-erosion.

11. The folded pendulum according to claim 1, wherein each of said joint systems comprises two joints.

12. The folded pendulum according to claim 1, wherein one or more joints are elliptic joints.

13. The folded pendulum according to claim 1, wherein said joint systems comprise two joints traced by removal of two ellipses with eccentricity e>3.2 and having mutual distance d>10 micron.

14. The folded pendulum according to claim 1, wherein the test mass has a form that is substantially parallelepipedic with a central opening, realized in order to reduce its mass.

15. The folded pendulum according to claim 1, wherein a distance between facing sides of the test mass or the support and in each case of the simple pendulum or inverted pendulum is at least of 250 µm.

16. An oscillations sensor, in particular seismic sensor, comprising:
- the folded pendulum according to claim 1; and
- a system for detection of an apparent displacement of a test mass with respect to a support.

17. The sensor according to claim 16, wherein said system for detection of the apparent displacement of the test mass is an optical system and comprises:
- a light source that sends a light beam on to said test mass, and precisely on to a mirror,
- the mirror that is integral to said test mass,
- a device for detection of the light reflected by said mirror, and
- an electronic elaboration device for calculation of said apparent displacement.

\* \* \* \* \*